No. 743,047. PATENTED NOV. 3, 1903.
F. STUTZMAN.
CUTTER HEAD.
APPLICATION FILED MAY 2, 1903.

NO MODEL. 2 SHEETS—SHEET 1.

Attest:
C. Middleton
James M. Spear

Inventor.
Frank Stutzman.
by His Spear Company
Attys.

No. 743,047. PATENTED NOV. 3, 1903.
F. STUTZMAN.
CUTTER HEAD.
APPLICATION FILED MAY 2, 1903.
NO MODEL. 2 SHEETS—SHEET 2.

Attest:
C. M. Madden
James M. Spear

Inventor:
Frank Stutzman,
by Ellis Spear Company
Atty's

No. 743,047. Patented November 3, 1903.

UNITED STATES PATENT OFFICE.

FRANK STUTZMAN, OF WILLIAMSPORT, PENNSYLVANIA, ASSIGNOR OF ONE-FOURTH TO ABRAHAM FISCHER, OF WILLIAMSPORT, PENNSYLVANIA.

CUTTER-HEAD.

SPECIFICATION forming part of Letters Patent No. 743,047, dated November 3, 1903.

Application filed May 2, 1903. Serial No. 155,399. (No model.)

*To all whom it may concern:*

Be it known that I, FRANK STUTZMAN, a citizen of the United States, residing at Williamsport, Pennsylvania, have invented certain new and useful Improvements in Cutter-Heads, of which the following is a specification.

My invention relates to improvements in rotary cutter-heads for woodworking-machines of that class in which the head is made in two parts capable of adjustment with relation to each other.

I have aimed to provide an exceedingly simple, durable, and efficient form of head in which the cutters shall be held in an improved manner, so as to be readily removed and replaced. I have also aimed to so arrange the parts that the walls of each section or part shall operate in the most efficient manner as chip-breakers for the cutters carried by each part and shall aid in holding or bracing the cutters carried by the adjoining part.

To this end the invention comprises the construction and arrangement of parts hereinafter described, and particularly pointed out in the claim.

The invention is illustrated in the accompanying drawings, in which—

Figure 1:
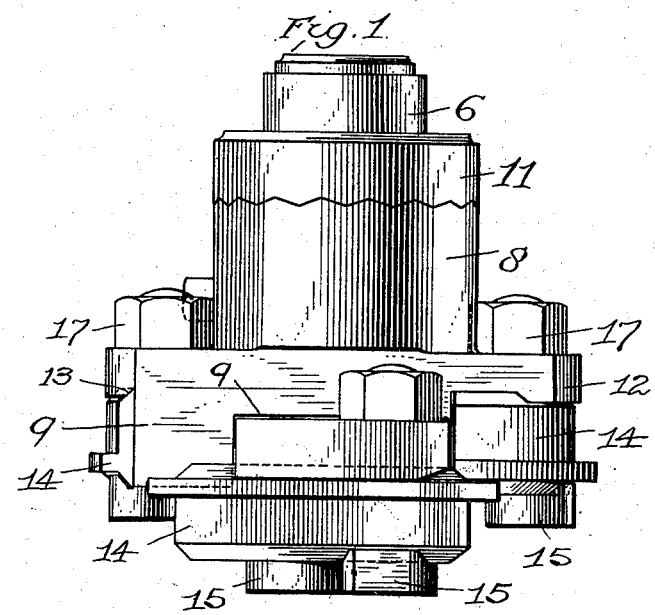
Figure 2:
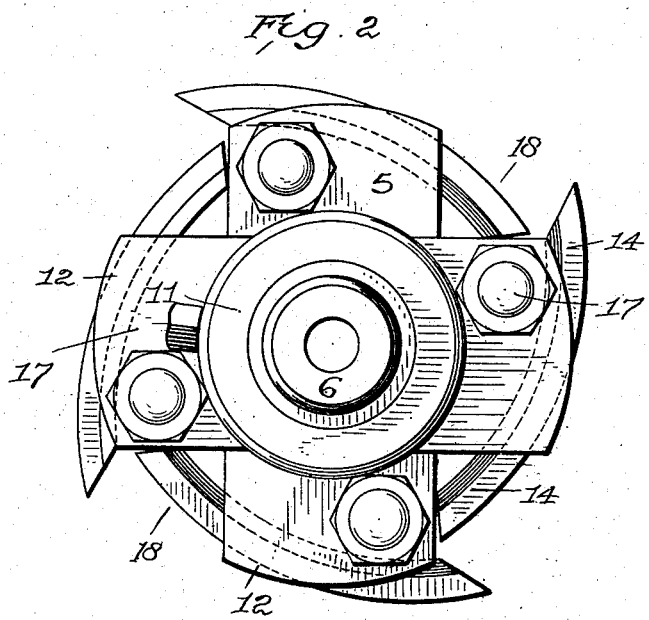
Figure 3:
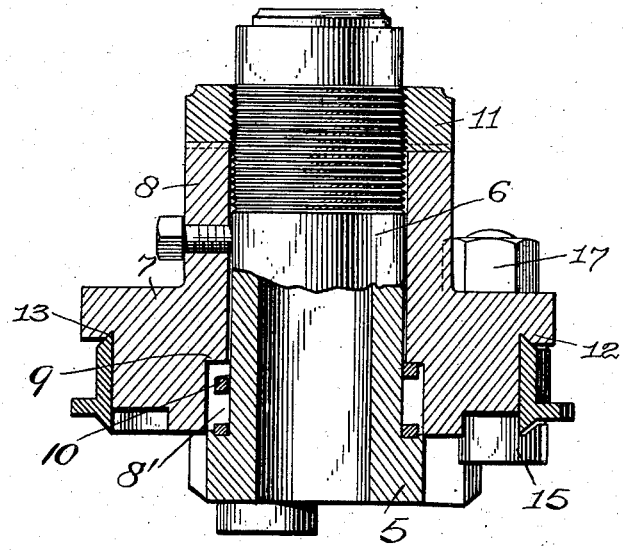
Figure 4:
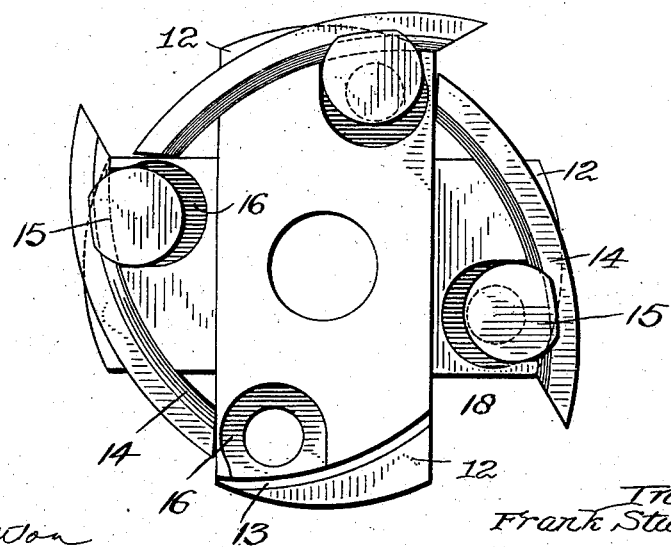

Figure 1 is a side elevation. Fig. 2 is a plan view. Fig. 3 is a central vertical section. Fig. 4 is a bottom plan view.

The cutter-head, as shown in these figures, comprises a stationary section 5, having a tubular hub 6, adapted to be received upon a rotating spindle in the ordinary or any desired manner, and an adjustable section 7, having a tubular shank 8, fitting over the hub 6 of the stationary section. Each of these sections has parallel side walls, as shown, and the stationary section has a recess in its inner face corresponding in width to the width of the adjustable section. The adjustable section likewise has a recess 9, corresponding to the recessed portion of the stationary section. A suitable spring 10 encircles the hub 6 in the recesses between the sections and tends to separate them, and they are drawn together and held so as to occupy any desired relative position by a collar 11, threaded on the hub 6. It will be observed that the end of each section is provided with a tool-holding flange 12, which starting at zero in depth at the advancing edge or face of the section increases in depth toward the opposite side. Each flange is provided with a beveled under face, forming a recess 13 to receive the correspondingly-beveled edge of the cutter 14. The curved inner face of each cutter lies against the curved end of the section at the side of the flange, and its opposite side is clamped in place by the overlapping lip or flange of a grooved bolt-head 15, resting in a recess 16 and held in clamping position by a nut 17. It will be observed that each cutter is made of such a length that its rear end rests against the face of the companion section, and thus all circumferential strain on the cutters is borne by the side walls of the head-sections and the holding-bolts relieved of much of the strain which in ordinary forms of cutter-heads comes upon them. It will also be noticed that the advanced corner of each section is perfectly straight and joins the working face of the cutter at an obtuse angle and also that a wide face at this point is provided, as indicated at 18, Fig. 1. This construction provides an effective chip-breaker and prevents clogging of the cutters.

Having thus described my invention, what I claim is—

In a cutter-head, a pair of crossed sections, each having parallel side walls forming right-angular recesses at the corners, each section having at each end a tapered flange starting at zero at its advanced edge and increasing in width at its opposite edge, a cutter for each end of each section having one edge seated in a groove in the face of the corresponding flange, a bolt passing through the end of each section having a recessed head to engage the opposite edge of the cutter, the rear end of each cutter abutting against the side of the next succeeding section and the working face of each cutter forming an obtuse angle with the face of the section against which the rear end of the preceding cutter abuts, substantially as described.

In testimony whereof I affix my signature in presence of two witnesses.

FRANK STUTZMAN.

Witnesses:
W. M. EDWARDS,
A. R. JACKSON.